Dec. 4, 1962
R. N. FLECK ET AL
3,067,271
OLEFIN IN RECOVERY PROCESS
Filed April 25, 1957
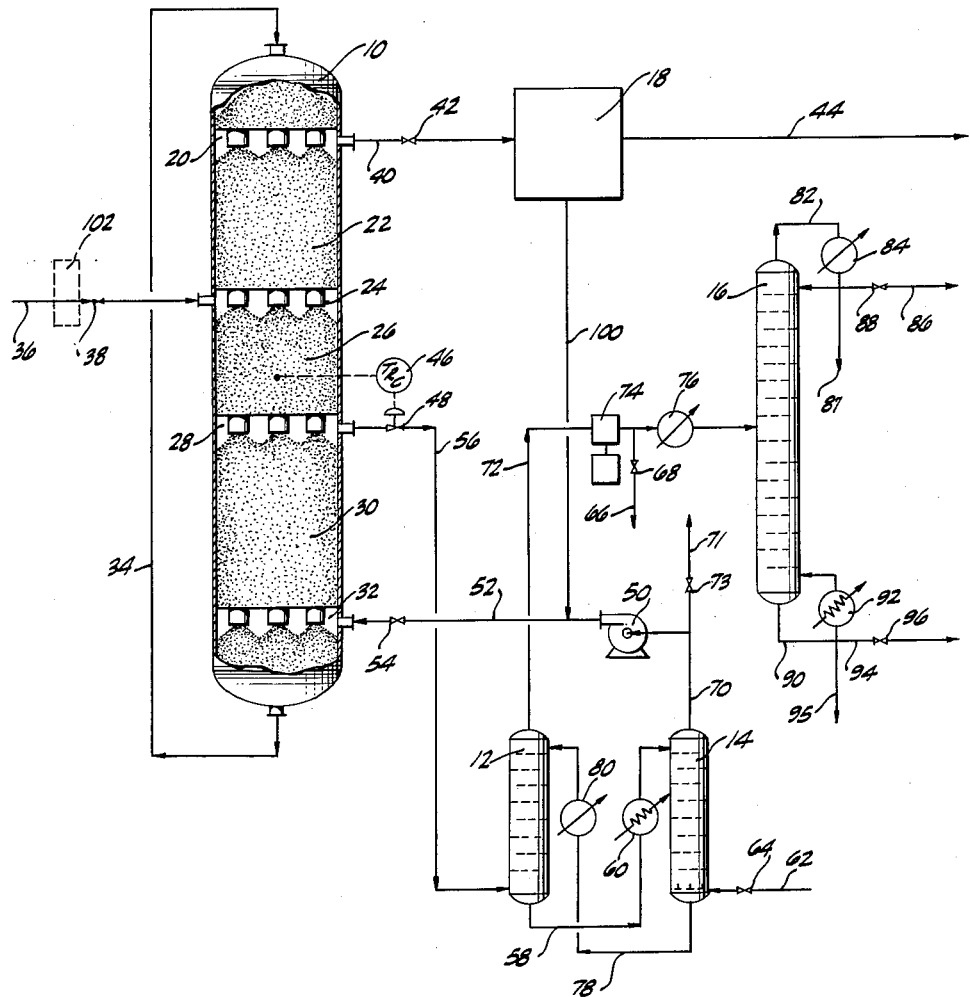
INVENTORS.
RAYMOND N. FLECK,
CARLYLE G. WIGHT,
BY
ATTORNEY.

United States Patent Office 3,067,271
Patented Dec. 4, 1962

3,067,271
OLEFIN RECOVERY PROCESS
Raymond N. Fleck, Whittier, and Carlyle G. Wight, Fullerton, Calif., assignors to Union Oil Company of California, Los Angeles, Calif., a corporation of California
Filed Apr. 25, 1957, Ser. No. 655,124
15 Claims. (Cl. 260—677)

This invention relates to the adsorptive fractionation of normally gaseous olefin hydrocarbons from dilute gas streams. The invention relates particularly to the separation of ethylene and/or propylene from dilute gaseous mixtures of these olefins such as cracked refinery gas or coke oven gas by contacting these gaseous mixtures with particular zeolitic metallo alumino silicate adsorbents and treating the adsorbents essentially isothermally by particular steps to recover the adsorbed ethylene.

The chemical reactivity of olefin hydrocarbons is well known. There are presently well established chemical industries based upon the reactions of such olefins as ethylene and others to produce a great variety of chemical compounds. For example, there are currently operating several high and low pressure polymerization processes by means of which ethylene is converted into a variety of synthetic plastic materials.

With respect to ethylene at least, the commercial source is principally gaseous mixtures containing relatively high concentrations of ethylene, namely 40% by volume and more. These streams are produced by thermally or catalytically cracking other hydrocarbon gases such as natural gas, propane, natural gasoline, heavier fuels oils, and the like. There is another rich but untapped source of ethylene in the form of refinery cracking plant dry gas containing relatively low concentrations of ethylene. Because of these low concentrations, the gas is not treated for the recovery of this material but instead is ordinarily vented into the refinery fuel system. The ethylene concentration is of the order of 10% by volume and the ordinary processes for recovering it are uneconomical. Another source of ethylene, which is characterized by relatively low concentration, is coke oven gas in which the ethylene ordinarily occurs at concentrations of about 5% or less. The ethylene is also not recovered ordinarily for the same reasons.

The present invention is directed to an improved process which is capable of separating economically the ethylene values from dilute ethylene mixtures similar to the two types mentioned above. The invention involves a novel adsorptive fractionation process in which the dilute ethylene-bearing gas is contacted with a specific inorganic adsorbent to produce an unadsorbed lean effluent or raffinate which is substantially free of ethylene. The rich adsorbent containing the adsorbed ethylene is treated essentially isothermally, that is at a temperature substantially equal to that maintained during contact with the feed gas, to remove the adsorbed ethylene. This treatment involves contact with an acidic gas such as carbon dioxide or hydrogen sulfide or mixtures thereof to produce a rich effluent or extract. The recovery of ethylene from the adsorbent is distinct from the usual adsorbent-desorption process in that the temperature of the adsorbent is not deliberately raised during the desorption or stripping in order to recover the adsorbed materials. The temperatures of the adsorption and desorption steps are substantially the same and are determined by the temperatures of the adsorbent and the gas entering for contact. The removal of the ethylene from the adsorbent is effected by a displacement exchange medium recirculated through the desorption zone. The ethylene is evolved from the adsorbent through displacement with the acidic gas which in turn is adsorbed in exchange for the ethylene. The rich effluent or extract stream is then treated to recover the acidic gas for recirculation in the process leaving the ethylene as a process product. The unadsorbed lean effluent or raffinate is similarly treated for the recovery of these acidic gases for recirculation in the process through the displacement exchange zone.

It is therefore a primary object of the present invention to provide an improved adsorptive fractionation process.

It is a specific object of this invention to provide for the recovery of light normally gaseous olefin hydrocarbons by adsorptive fractionation of dilute olefin-containing streams not otherwise economically processable.

It is a further object to recover normally gaseous olefin hydrocarbons, i.e., ethylene and propylene, from gaseous mixtures comprising the same by selective adsorption on a metallo alumino silicate adsorbent to obtain a rich adsorbent which is then treated for olefin removal at substantially the same temperature as the adsorption temperature by contacting it with a recirculated stream of carbon dioxide or hydrogen sulfide or both.

Other objects and advantages of the present invention will become apparent to those skilled in the art as the description and illustration thereof proceed.

The present invention will be most readily understood from the following description of the accompanying drawing in which is shown a schematic flow diagram of the process of this invention. The description is conducted, for purposes of an example, in terms of the recovery of ethylene and propylene by fractionation of the cracked dry gas produced by the distillation of the gasoline-containing effluent from the catalytic thermal cracking of gas oil.

Referring now more particularly to the drawing, the essential apparatus elements include adsorptive fractionation column 10, lean effluent absorption column 12, stripping column 14, olefin distillation column 16, and a rich effluent absorption-stripping system 18 which is essentially identical to the system comprising columns 12 and 14. In the present invention a specific granular solid adsorbent is employed because it has been found that it alone is effective in the process whereas other adsorbents appear to be ineffective. The present adsorbent is a zeolitic metallo alumino silicate adsorbent produced synthetically and having substantially uniformly sized pores in the crystal lattice available for adsorption, the pore diameter being approximately 4 A. This adsorbent is described in greater detail below where its composition, methods of preparation, and a commercial source are given.

In the drawing, selective adsorption column 10 is provided at successively lower levels with raffinate disengaging zone 20, feed gas adsorption zone 22, feed gas engaging zone 24, adsorbent rectification zone 26, extract disengaging zone 28, displacement exchange zone 30, and displacement fluid engaging zone 32. The adsorption column is provided with a solids conveyor 34, which may be any of the commercially available types and is preferably one characterized by a low solids attrition rate, and which serves to remove the adsorbent from the bottom of the column and reintroduce it at the top thus maintaining a downwardly moving adsorbent bed in column 10.

The dilute olefin-containing dry gas produced in the catalytic cracking of gas oil has a composition given in Table 1.

TABLE 1

*Feed Gas Composition*

| Component: | Mol percent |
|---|---|
| Hydrogen and fixed gases | 25.1 |
| Methane | 32.2 |
| Ethylene | 7.4 |
| Ethane | 16.6 |
| Propylene | 7.5 |
| Propane | 7.4 |
| $C_4$ and $C_5$ | 2.6 |
| Hydrogen sulfide | 1.2 |
| | 100 |

This feed gas is introduced at a temperature of between about 0° F. and about 200° F., usually about 100° F., and a pressure of 10 p.s.i.g. through line 36 at a rate controlled by valve 38 into engaging zone 24. It passes upwardly countercurrent to the downwardly moving bed of the 4 A. zeolitic adsorbent in adsorption zone 22 wherein the ethylene and propylene components are substantially completely adsorbed to the exclusion of substantially all of the lighter less readily adsorbable materials, as well as the heavier saturated materials which are non-adsorbable due to their molecular size. The olefin adsorption causes the displacement of the hydrogen sulfide displacement exchange material with which the adsorbent is saturated when it is introduced at the top of the column. The non-adsorbed constituents of the feed gas, together with the displaced hydrogen sulfide, constitute the lean effluent or raffinate. This gas flows through line 40 from disengaging zone 20 at a rate controlled by valve 42 and has the composition given below in Table 2, second column. It is treated in treating zone 18 to effect recovery of hydrogen sulfide in the same manner as is the rich effluent described subsequently. The treated lean effluent product flows through line 44 to further processing or storage facilities not shown and has the composition given in Table 2, column 3. All normal hydrocarbons heavier than $C_5$ were previously removed so as to avoid interference with the olefin adsorption.

TABLE 2

| Component | Lean Effluent, Mol Percent | Treated Lean Effluent, Mol Percent |
|---|---|---|
| Hydrogen and fixed gases | 18.7 | 22.6 |
| Methane | 34.9 | 42.1 |
| Ethylene | 0.1 | 0.15 |
| Ethane | 18.0 | 21.8 |
| Propylene | 0.1 | 0.15 |
| Propane | 8.1 | 9.7 |
| $C_4$ and $C_5$ | 2.8 | 3.4 |
| Hydrogen Sulfide | 17.3 | 0.1 |
| | 100 | 100 |

The recovered hydrogen sulfide recovered in treating zone 18 is recirculated in the process via line 100 as hereafter described.

The rich adsorbent containing the adsorbed ethylene and propylene flows downwardly by gravity into and through rectification zone 26. Here the rich adsorbent is countercurrently contacted with a reflux gas containing a relatively high concentration of both ethylene and propylene, as well as some hydrogen sulfide. The adsorption of this reflux gas by the adsorbent effectively displaces adsorbed traces of the constituents normally produced in the raffinate or overhead product. This reflux gas flows upwardly from disengaging zone 28 at a rate controlled by temperature recorder controller 46 which operates valve 48 to control the rate of removal of the extract stream subsequently described.

The rectified adsorbent continues downwardly through displacement exchange zone 30 in which a recirculating stream of hydrogen sulfide contacts the rectified adsorbent at substantially the same temperature as that existing in the adsorption zone 22. The hydrogen sulfide is introduced by means of recycle blower 50 through line 52 at a rate of between about 1.0 and about 3.0 mols per mol of ethylene-propylene to be displaced, and is controlled by valve 54. This gas stream consists of about 95 mol percent hydrogen sulfide. The displacement exchange stream flows upwardly from engaging zone 32 countercurrent to the rectified adsorbent in zone 30 at temperatures on the order of 0° F. to about 200° F., and usually about 100° F., or within a few degrees of the adsorption zone temperature. The exchange stream is preferentially adsorbed at least in part by the adsorbent in exchange for the adsorbed ethylene and propylene which it displaces from the adsorbent. The mixture thus produced consists essentially of hydrogen sulfide, ethylene, and propylene, and is used in part as the aforementioned reflux gas while the remainder is removed through line 56 at a rate controlled by valve 48 as the extract stream. The adsorbent removed from displacement exchange zone 30 is essentially saturated with hydrogen sulfide.

The extract stream removed through line 56 is introduced into the base of adsorption column 12 and passes upwardly therethrough countercurrent to a descending stream of basic solvent such as diethanolamine, monoethanolamine, or other similar solvents. The hydrogen sulfide is thus absorbed forming a rich solvent and leaves ethylene and propylene unabsorbed. The rich solvent is pumped by means of a pump not shown through line 58 and heater 60 into the top of stripper column 14. The rich hot solvent flows downwardly through the column and is freed of the absorbed hydrogen sulfide. If desired, a stripping gas is introduced through line 62 at a rate controlled by valve 64 into the bottom of the column to assist the stripping. When such a stripping gas is employed it is preferably part of the rich effluent or extract product removed from the outlet of compressor 74 and passed through line 66 controlled by valve 68. If desired, the stripping gas may be taken from the overhead or bottoms products of column 16 instead via lines 87 or 95. The evolved hydrogen sulfide, together with any of the constituents of the feed derived from the use of such stripping gas, is removed from the top of stripper column 14 through line 70 and is introduced into blower 50 for recirculation in displacement exchange zone 30. The hot stripped absorbent solution is pumped from the bottom of stripping column 14 through line 78 and absorbent cooler 80 into the top of absorption column 12 for recirculation.

The gases unabsorbed from absorption column 12 have a composition given below in Table 3.

TABLE 3

*Extract Composition*

| Component: | Mol percent |
|---|---|
| Hydrogen | 0.0 |
| Methane | 0.1 |
| Ethylene | 49.5 |
| Ethane | 0.1 |
| Propylene | 50.1 |
| Propane | 0.1 |
| $C_4$ and $C_5$ | 0.0 |
| Hydrogen sulfide | 0.1 |
| | 100 |

This gas flows through line 72, is compressed to a pressure of about 400 p.s.i.g. in compressor 74, is refrigerated in cooler 76, and is introduced into olefin distillation column 16. The overhead vapor taken from column 16 through line 82 is at least partly condensed in condenser 84. Part of the condensate is used as reflux in the top of the column, with the remainder being produced through line 86 at a rate controlled by valve 88 as one of the principal olefin products of the process. The heavier propylene is removed from the bottom of the column through line 90, is partially reboiled in reboiler 92 to supply heat to the bottom of the column, and the remainder is produced through line 94 at a rate controlled by valve 96 as the other principal olefin product of the process. Depending upon the efficiency of the distillation effect in distillation column 16, the purity of the ethylene and propylene produced according to this process is substantially 100%.

In the event that considerable hydrogen sulfide occurs normally in the feed, it must be produced from the process as a product or else it will accumulate in the displacement exchange recycle stream. For this reason line 71 controlled by valve 73 is provided for hydrogen sulfide removal.

The present invention as described immediately above is also applicable to the recovery of gaseous olefins such as ethylene and propylene in which the hydrogen sulfide is substituted with carbon dioxide. This acidic gas is separated from the various effluents in the same way as described above and appears to be as effective as hydrogen sulfide in the displacement exchange of ethylene or propylene or both from the 4 A. metallo alumino silicate adsorbent. If it occurs naturally in the feed stream, a carbon dioxide product stream is removed at an equivalent flow rate from the displacement exchange recycle stream.

Although the example given above in relation to the description of the drawing involved a feed gas stream containing substantial quantities of both ethylene and propylene, this is not to be construed as a limitation in the process since it will operate successfully with gas streams consisting essentially of either ethylene or propylene. In such a case where there is only one olefin present or only one olefin together with only trace amounts of the other olefin which can be tolerated as an impurity, olefin distillation column 16 may be eliminated and the olefin product produced directly through line 72 from the top of the absorption column 12.

Further, normal butene may also be recovered by this process from dilute streams provided the zeolitic adsorbent having 5 A. pores is substituted for the 4 A. adsorbent described above. Preferably in such a case the feed stream does not contain normal paraffins heavier than $n$-$C_6$.

Preferably, the feed gas mixture is pretreated to remove any normal paraffin hydrocarbons with a carbon chain having over two more carbon atoms than the lightest olefin to be adsorbed and recovered. For example, the feed should be free of normal pentane and heavier when ethylene is being recovered, normal hexane and heavier when propylene is being recovered and normal heptane and heavier when normal butene is being recovered.

Because of the use in the present process of displacement exchange streams which consist of acidic gases like hydrogen sulfide and carbon dioxide, it is essential that basically reacting materials such as ammonia, normally gaseous amines, and the like be absent from the feed stream. Accordingly, the present invention contemplates the inclusion of a pretreatment of the feed stream in zone 102 when such basic constituents are present. This treatment may consist of a dilute acid wash or the passage of the feed gas through an adsorbent similar to that recirculated in adsorption column 10, but which has pores open for adsorption which are of the order of more than 7 A. in diameter such as 10 to 13 A. In this way including basic constituents such as ammonia are adsorbed from the feed so that they cannot interfere with the proper functioning of the 4 A. or 5 A. adsorbent circulated in column 10.

The adsorbent employed in the process of this invention is a solid granular material having a mesh size range between about 2 and 100 mesh and preferably between about 4 and about 30 mesh. It is used in the form of a dense compact bed of material through which the feed and displacement and exchange recycle streams pass, either in the vapor phase or in the liquid phase. The process may employ the adsorbent in the form of a single static bed of material in which case the process is only semicontinuous. Preferably a plurality of two or more static beds of adsorbent are employed with appropriate remotely operable valving so that the feed stream is passed through one or more of the adsorbers in a set while the displacement exchange stream passes through one or more of the other adsorbers in the set. In this case the feed and product flows are continuous, in either the vapor or liquid phase, and either up or down through the adsorbent. The mechanical apparatus employed in static bed adsorbent contact with the gas stream is conventional and well known to those skilled in the art.

The moving solids bed modification illustrated above may be employed in which flow of feed is maintained continuously through an adsorption zone, the flow of displacement exchange fluid is maintained continuously through a desorption zone, and the granular adsorbent is recirculated successively through these two zones. With the smaller sized mesh ranges of adsorbent, i.e. the powdered adsorbents, the material may be fluidized in and by the fluid streams contacting it. The necessary apparatus is also conventional and well known to those skilled in the art. The compact bed modifications are preferred since a greater number of theoretical and actual contact stages are more readily obtained in smaller and simpler equipment. Accordingly this modification was illustrated above.

The present invention may not be carried out with the commonly available solid granular adsorbents. For example, in the separation of ethylene and/or propylene from coke oven and cracked dry refinery gases, the only adsorbents which may be used in the present invention are the natural or synthetic crystalline partially dehydrated metallo alumino silicates having pore diameters of about 4 A. or 5 A. The composition of one typical synthetic zeolite having a pore size of about 4 A. is $$[Na_2O \cdot Al_2O_3 \cdot (SiO_2)_2]$$

It may be prepared by heating essentially stoichiometric quantities of alumina and silica with excess caustic under pressure. The excess caustic is washed out to produce the hydrous gel, and the latter is then activated by partial dehydration. It functions very efficiently in separating ethylene or propylene or both from dilute mixtures. Part of the sodium in this material can be ion exchanged with concentrated salt solutions at superatmospheric pressure and temperatures of 150–300° C. to introduce other metal ions such as calcium to produce $$[CaO \cdot Al_2O_3 \cdot (SiO_2)_2]_{0.7}[Na_2O \cdot Al_2O_3 \cdot (SiO_2)_2]_{0.3}$$

having a pore size of about 5 A. This is preferred in the separation of butanes from gas mixtures. Certain naturally occurring minerals, such as chabazite, analcite, gmelinite, and the like, can be heated to dehydrate the molecule and obtain an activated zeolitic adsorbent similar in adsorption properties to the manufactured materials. These natural and synthetic materials are all zeolites and their sodium and calcium derivatives are very stable adsorbents which apparently have "pores" available for adsorption which are quite uniform in size. Other derivatives of these particular inorganic adsorbent materials have uniformly sized pores as high as about 13 A. and these will absorb molecules having a dimension less than about 13 A. and will exclude a material whose minimum molecular dimension is above 13 A.

The synthetic crystalline partially dehydrated metallo alumino silicate zeolitic adsorbents are presently available items of commerce marketed by Linde Air Products Company, 30 E. 42nd Street, New York 17, New York, under the name of "Molecular Sieves 4A, 5A, 13X, etc."

Some adsorbents, particularly silica gel and activated alumina tend to absorb rather strongly polar materials to varying degrees. The metallo alumino silicates with larger pores adsorb polar molecules to a similar extent. As indicated above, it is contemplated in this invention to contact the feed stream first with a material which exhibits very strong adsorptive forces for these polar materials and remove them from the stream to be treated. This pre-adsorption or pretreating of the feed may be accomplished by contacting the feed stream with an inorganic halide such as copper chloride, calcium chloride, magnesium chloride, and the like. One preferred form of this pretreatment is to contact the feed with the partially dehydrated metallo alumino silicate having pores on the order of 10 A. to 13 A. in diameter. One designated as molecular sieve 13X and having 13 A. pore diameters has a composition corresponding essentially to $5Na_2O \cdot 6Al_2O_3 \cdot 15SiO_2$. In this way large and highly polar materials such as ethers, thio-ethers, water, alcohols, mercaptans, ammonia, and amines are readily removed from the feed. Also removable in this way are the highly polar nitrogen and sulfur compounds which commonly occur in small amounts in gasolines. These specifically include such materials as thiophene and the alkylated thiophenes, pyridine and alkylated pyridines. Thus this pretreatment removes these polar materials and prevents them from interfering with the subsequent fractionation in which the feed is separated into streams containing components of a specific molecular size or structure.

Although the pre-adsorption step prevents rapid deactivation of the main adsorbent beds, some deactivation may eventually occur. It is within the contemplation of this invention to regenerate the adsorbent by high temperature stripping with steam or other stripping gas, to treat with hot flue gas to burn off the impurities as in catalyst regeneration, or both.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. The process for separating an olefine product selected from the class consisting of ethylene, propylene, and mixtures of ethylene and propylene from a feed mixture comprising the same and straight chain paraffin hydrocarbons the chain length of which does not exceed that of said olefine product by more than two carbon atoms, which process comprises (1) contacting said feed mixture with a lean adsorbent essentially comprising a partially dehydrated zeolitic metallo alumino silicate having substantially uniform pores between about 4 A. and about 5 A. in diameter and containing the hereinafter defined displacement exchange medium, whereby there is obtained a rich adsorbent containing said olefine product and a lean effluent comprising non-adsorbed components of the feed mixture and said displacement exchange medium; (2) contacting said rich adsorbent with a displacement exchange medium selected from the class consisting of hydrogen sulfide and carbon dioxide, said contacting being carried out at substantially the same temperature as that employed in step (1), whereby there is produced a rich effluent comprising said olefine product and said displacement exchange medium and a lean adsorbent containing said displacement exchange medium; and (3) treating said rich effluent to separate said displacement exchange medium therefrom.

2. The process of claim 1, wherein steps (1) and (2) are carried out at substantially the same temperature between about 0° F. and about 200° F., and the said feed mixture and displacement exchange medium are in the gaseous phase.

3. The process of claim 1, wherein the said olefine product is propylene.

4. The process of claim 1 wherein the said olefine product is a mixture of ethylene and propylene.

5. The process of claim 1 wherein the said displacement exchange medium is a gas essentially comprising hydrogen sulfide.

6. The process of claim 1 wherein the said displacement exchange medium is a gas essentially comprising carbon dioxide.

7. The process for recovering an olefine product selected from the class consisting of ethylene, propylene, and mixtures of ethylene and propylene from a feed gas mixture comprising the same and straight chain paraffin hydrocarbons the chain length of which does not exceed that of said olefine product by more than two carbon atoms, which process comprises: (1) contacting said feed gas mixture with a lean adsorbent essentially comprising a partially dehydrated zeolitic metallo alumino silicate having substantially uniform pores between about 4 A. and about 5 A. in diameter and containing the hereinafter defined displacement exchange medium, whereby there is obtained a rich adsorbent containing said olefine product and a lean effluent comprising non-adsorbed components of said feed gas mixture and said displacement exchange medium; (2) contacting the said rich adsorbent with a gaseous displacement exchange medium essentially comprising an acidic gas selected from the class consisting of hydrogen sulfide and carbon dioxide, said contacting being carried out at substantially the same temperature as that employed in step (1), whereby there is obtained a rich effluent comprising said olefine product and said displacement exchange medium and a lean adsorbent containing said displacement exchange medium; (3) returning said lean adsorbent to step (1); (4) treating said lean effluent to recover the said displacement exchange medium therefrom; (5) treating said rich effluent to recover the said displacement exchange medium therefrom; and (6) returning the displacement exchange medium recovered in steps (4) and (5) to step (2).

8. The process of claim 7 wherein steps (1) and (2) are carried out at substantially the same temperature between about 0° F. and about 200° F.

9. The process of claim 7 wherein the said olefine product is ethylene.

10. The process of claim 7 wherein the said olefine product is propylene.

11. The process of claim 7 wherein the said olefine product is a mixture of propylene and ethylene, and wherein the olefine product obtained in step (5) is fractionally distilled to separate the propylene and ethylene.

12. The process of claim 7 wherein, in steps (4) and (5), the said displacement exchange medium is recovered by selective absorption in an alkaline liquid absorbent.

13. The process of claim 7 wherein the said displacement exchange medium is hydrogen sulfide.

14. The process of claim 7 wherein the said displacement exchange medium is carbon dioxide.

15. The process of claim 7 wherein steps (1) and (2) are carried out in separate zones, the said silicate is passed as a moving bed through said zones in succession, and within said zones said silicate is contacted countercurrently with said feed mixture and said displacement exchange medium, respectively.

References Cited in the file of this patent

UNITED STATES PATENTS

| | | |
|---|---|---|
| 2,519,343 | Berg | Aug. 22, 1950 |
| 2,603,553 | Berg | July 15, 1952 |
| 2,818,455 | Ballard et al. | Dec. 31, 1957 |
| 2,834,429 | Kinsella et al. | May 13, 1958 |
| 2,859,170 | Dickens et al. | Nov. 4, 1958 |
| 2,866,835 | Kimberlin et al. | Dec. 30, 1958 |

OTHER REFERENCES

Linde Air Products, Chemical and Engineering News, vol. 32, page 4786, November 29, 1954.

Breck et al.: Journal of the American Chemical Society, vol. 78, No. 23, pp. 5963–5971, December 5, 1956.